United States Patent [19]

Bazelaire et al.

[11] Patent Number: 4,617,174
[45] Date of Patent: Oct. 14, 1986

[54] AUTOMATIC AUTONOMOUS APPARATUS FOR THE FAST PRODUCTION OF POLYURETHANE FOAM

[75] Inventors: Bernard Bazelaire, Merignac; Jean-Claude Clebant, Carbon-Blanc, both of France

[73] Assignee: Commissariat a l'Energie Atomique, Paris, France

[21] Appl. No.: 713,793

[22] Filed: Mar. 20, 1985

[30] Foreign Application Priority Data

Mar. 22, 1984 [FR] France .............................. 84 04457

[51] Int. Cl.[4] ............................................ B01J 14/00
[52] U.S. Cl. .................................... 422/133; 169/27; 169/28; 422/112; 422/169; 422/224; 422/305; 422/135
[58] Field of Search ................ 422/129, 133, 164–167, 422/135, 112, 224, 305; 222/136; 169/14, 78, 82, 26–28

[56] References Cited

U.S. PATENT DOCUMENTS

| 2091925 | 8/1982 | GBX . | |
|---|---|---|---|
| 2,496,160 | 1/1950 | Hesson | 169/28 |
| 2,689,613 | 9/1954 | Whatley | 169/27 |
| 3,091,923 | 6/1963 | Barnes | 222/136 |
| 3,295,724 | 1/1967 | Brooks et al. | 422/133 |
| 3,401,750 | 9/1968 | Larsen | 169/28 |
| 3,613,794 | 10/1971 | Naumann et al. | 169/28 |
| 4,126,184 | 11/1978 | Hinrichs . | |
| 4,202,279 | 5/1980 | Rand . | |
| 4,415,269 | 11/1983 | Fraser | 422/133 |

FOREIGN PATENT DOCUMENTS 2091925 8/1982 United Kingdom .

Primary Examiner—Michael S. Marcus
Attorney, Agent, or Firm—Michael N. Meller

[57] ABSTRACT

The foam is produced by mixing an isocyanate with a polyalcohol from a tight storage tank with two compartments, each of which contains one of the aforementioned products, the upper part of the tank being provided with a solid propellant trip or starter, which generates a pressurization gas form the tank. In the lower part of the storage tank, there is a pressure threshold mixer, whose operation is automatically controlled by the pressure prevailing in the tank and which has a mixing chamber entered (under the effect of the same pressure) by the isocyanate and the polyol via lateral injection nozzles, which produce a rotation of the mixture, the polyols being previously emulsified by a neutral gas (such as air or nitrogen) from a pressurized storage container.

2 Claims, 3 Drawing Figures

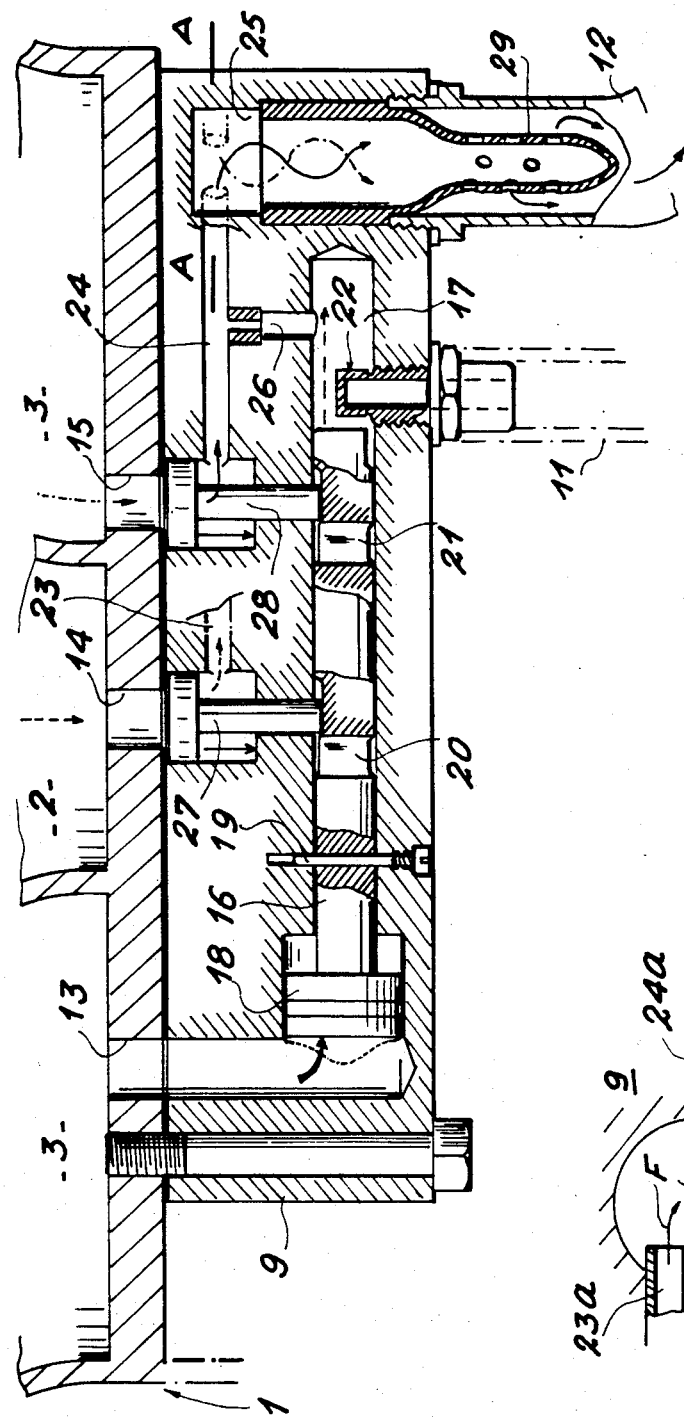
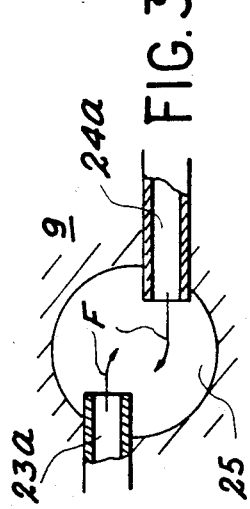
FIG. 2
FIG. 3

AUTOMATIC AUTONOMOUS APPARATUS FOR THE FAST PRODUCTION OF POLYURETHANE FOAM

BACKGROUND OF THE INVENTION

In general terms, the present invention relates to the production of polyurethane foam by mixing an isocyanate with a polyalcohol, particularly a polyol.

In industry, such polyurethane foams are generally produced by a machine having two components with two separate tanks ensuring the dosing of the starting products with the aid of high pressure positive displacement pumps. Such apparatuses, which are well suited to heavy installations for continuous production, have a relatively long operating time and do not very satisfactorily solve the problem of the fast production of a large amount of polyurethane foam at the place where it will be used, particularly due to the weight and overall dimensions required, which are incompatible with the construction of a portable system.

Other means for realizing the basic starting product for a polyurethane foam have been designed, such as low pressure mixing using a mechanical stirrer, e.g. an immersed propeller, downstream of a volumetric dosing system. However, such an apparatus is relatively complex, if its operation is to be made automatic and reliable at any location where an intervention is necessary.

It has been found that it is possible to use the fast, in situ production of large amounts of polyurethane foam for protecting precious objects, such as those located in banks and in safes within the latter by rapidly concealing them in such a foam, which constitutes a dissuasive, impenetrable envelope for third parties wishing to steal such objects.

SUMMARY OF THE INVENTION

The present invention relates to an automatic, autonomous apparatus for the fast production of polyurethane foam, which meets the above requirements, and which, operating at a mean pressure of 20 to 40 bars, has the essential feature of being hydropneumatic, i.e. it has no active mechanical part, but merely reliable, passive components, which have a good resistance to aging.

Thus, the present invention specifically relates to an automatic, autonomous apparatus for the fast production of polyurethane foam of the type in which said foam is produced by mixing an isocyanate with a polyalcohol, particularly a polyol, wherein it comprises a tight storage tank having two compartments, each of which contains one of the aforementioned products, the upper part of the tank being provided with a solid propellant trip or starter, which generates a gas for pressurizing the tank, whilst in the lower part of the storage tank is provided a pressure threshold mixer, whose operation is automatically controlled by the pressure prevailing in the tank and which has a mixing chamber into which, under the effect of said same pressure, pass the isocyanate and the polyol by means of lateral injection nozzles producing a rotation of the mixture, the polyol being previously emulsified by a neutral gas, such as air or nitrogen, which comes from a pressurized storage container, whose opening is also automatically controlled by the threshold mixer coming into operation.

Thus, the apparatus according to the invention, which permits a problemfree, prolonged storage of the basic products, is able to automatically bring about by the mere control of the starting up of the powder system, the local, fast production of large amounts of polyurethane foam, which protects precious objects to be rapidly concealed from the view of a possible robber. The apparatus has no active mechanical and in particular rotary part and it is only the pressure produced by the explosion of the powder trip or starter, which controls the automatic putting into operation of the apparatus and the fast production of the foam.

According to an important feature of the apparatus according to the invention, the mixer trip starter member is a manometric trigger means having a pressure threshold, which is able to slide in a linear channel between a storage position, where it is maintained in place by a calibrated shearable pin and an operating position in which it releases the outflow of the isocyanate, polyol and the emulsifying gas in the mixing chamber, passing from the storage position to the operating position being controlled by the appearance within the storage tank of a pressure threshold, which acts on the head of the trigger means and forces it to break the calibrated pin and move in translation in its rectilinear channel.

Thus, the manometric trigger means acts as a slide, whose displacement is controlled by the pressure produced in the storage tanks as a result of the explosion of the powder trip or starter. It is set so as to be sensitive to a pressure threshold in the form of the mechanical resistance of a shearable pin, which in normal time opposes its translation in the rectilinear channel.

Different known means can be used for ensuring the simultaneous pressurized ourflow of the isocyanate, polyol and emulsifying gas in the mixing chamber as a result of the displacement of the manometric trigger means. According to a preferred embodiment of the invention, this result is obtained with the aid of valves closing the lower parts of the isocyanate and polyol tanks and which, under the action of pressure, pass into openings made in the manometric trigger means, thus allowing the outflow of products into the channels provided for this purpose and directs them towards the mixing chamber. In the same preferred embodiment, the inert gas container is linked with a shearable head, positioned in the rectilinear displacement channel of the manometric trigger means and the latter is sheared during its translation, thus permitting the escape of the gas.

According to another interesting feature of the invention, the entry of the isocyanate and the polyol into the mixing chamber takes place in the upper part using two injection nozzles, which are displaced with respect to the axis of the chamber, so as to induce therein a whirling, rotary movement of the thus formed mixture. A sprinkler with a plurality of lateral orifices is positioned at the mixing chamber outlet, in order to bring about a local turbulence outflow, thereby increasing the homogeneity of the emulsified mixture.

BRIEF DESCRIPTION OF THE DRAWINGS

The invention is described in greater detail hereinafter relative to a non-limitative embodiment of a polyurethane foam production apparatus and with reference to the drawings, in which:

FIG. 2 shows constructional details of the pressure threshold mixer located at the bottom of the storage tank.

FIG. 3 in a section AA of FIG. 2 shows, the arrangement of the nozzles for injecting the two components into the mixing chamber.

DETAILED DESCRIPTION OF THE PREFERRED EMBODIMENT

Figure 1:
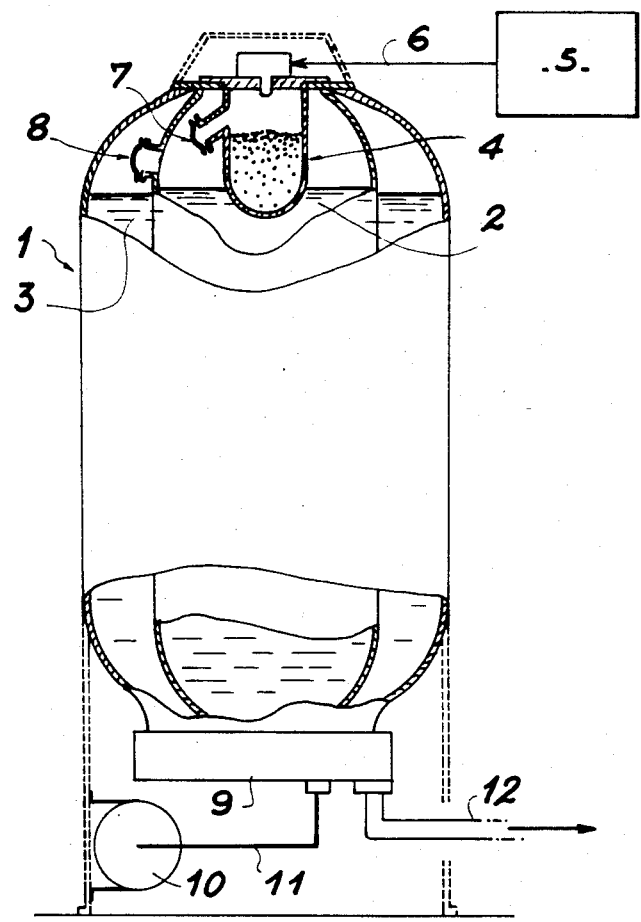
FIG. 1 shows the general installation diagram of the apparatus of FIG. 1.

FIG. 1 shows the tight tank 1, which comprises two tight, concentric compartments, namely a central compartment 2, e.g. containing the isocyanate of formula RNCO, in which R is an alkyl radical, as well as the outer peripheral compartment 3 containing the polyol. These two tight compartments make it possible to include in the polyol the useful quantity of foaming agents, without any risk of there being a variation in the composition of the mixture over a period of time.

In the upper part of tank 1 is provided a propellant or so-called explosive powder starter or trip 4 which, under the action of a trip instruction from trip means 5 via wire 6, can release a volume of hot gas under high pressure, which leads to the bursting of caps 7 and 8 and enables said pressurized gas to freely spread over compartments 2 and 3 of tank 1. Thus, all the energy necessary for the operation of the apparatus is released in a very short time, which is particularly advantageous for its rapid, automatic operation.

In the lower part of storage tank 1 is provided a pressure threshold mixer 9, which will be described in greater detail relative to FIG. 2, and which ensures, as a result of a starting instruction from trip means 5, the correct mixing and emulsifying of the isocyanate and polyol contained in compartments 2 and 3, their emulsification being produced by a neutral gas stored under pressure in a tank 10 and led to mixer 9 by pipe 11. This pressurized, neutral gas can be of a random nature, provided that it has no chemical action on the foam-producing components. It is standard practice to use e.g. air or nitrogen. The thus produced and emulsified mixture is discharged to the outside by pipe 12 to its place of immediate use.

According to a variant, a second tank could be provided, in parallel with tank 10, and which contains a lachrymatory or paralyzing toxic gas, so as to produce a special effect on the human environment.

FIG. 2 shows in greater detail the pressure threshold mixer 9, at the top of which are located compartments 2 and 3 of tank 1, which are linked with mixer 9, respectively by pipes 13, 14 and 15. This pressure threshold mixer 9 essentially comprises a manometric trigger means 16, which can move in rectilinear translation in a channel 17 under the effect of the pressure prevailing in compartment 3 and transmitted by pipe 13 to head 18 of manometric trigger means 16, which for this purpose is in the form of a piston head. The translation of the manometric trigger means 16 into channel 17 is, in normal times, prevented by a shearable pin 19, whose mechanical strength is calibrated in such a way that it provides the necessary resistance until a pressure threshold appears in compartment 3, which corresponds to the firing of the powder starter 4. This manometric trigger means has two orifices 20, 21 passing completely through the same and whose function will be explained hereinafter.

Into the end of channel 17 also issues the emulsifying gas supply pipe 11, which is terminated by a head 22 having a weak point, whose function is to permit its easy shearing, during a possible translation of the manometric trigger means 16.

Pipes 23 and 24 respectively supply the isocyanate and polyol from compartments 2 and 3 of tank 1 to the mixing chamber 25 for these two products. When they enter chamber 25, they are terminated by two nozzles 23a, 24a. A duct 26 supplies the emulsifying gas from pipe 11 to pipe 24 for supplying the polyol to mixing chamber 25.

Openings 14 and 15 are normally closed in the product storage position by valves 27, 28, which abut against the solid parts of the manometric trigger means 16. Finally, a perforated sprinkler 29 is located between the mixing chamber 25 and the start of the discharge pipe 12 for the mixed, emulsified products.

The system functions as follows. When, as a result of the tripping of the powder trip 4, a high pressure is exerted on the isocyanate and polyol in compartments 2 and 3 the manometric trigger means 16 is subject to the pressure resulting from the action of said gases on the piston head 18. When this pressure exceeds the calibration threshold of the shearable pin 19, the latter breaks, thereby releasing the trigger means 16, which is translated to the right in FIG. 2 and has three consequences. Firstly, it enables valves 27, 28, which are also subject to the pressure prevailing in compartments 2, 3, to pass into orifices 20, 21 to the right of which they are located, thus freeing the opening of openings 14, 15, giving free passage to the isocyanate and the polyol in pipes 23, 24, so that they can consequently reach the mixing chamber 25. At the same time, head 22 of pipe 11 is sheared by the end of the manometric trigger means 16, thus releasing the emulsifying gas in duct 26 so that it can join the polyol from pipe 24 on the way to mixing chamber 25.

FIG. 3 shows that the pipes 23, 24 enter chamber 25 in the form of two nozzles 23a, 24a, which are off-centered with respect to the axis of said chamber, so that the polyol and isocyanate discharged by nozzles 23a, 24a can start a whirling movement, simulated by arrows F, in chamber 25. Sprinkler 29, positioned downstream of the system, then makes it possible as a result of the numerous holes in its side walls, to fractionate the initial mixture, whilst causing a locally turbulent outflow. The association of the two injection nozzles 23a, 24a and the sprinkler 29 makes it possible to obtain a perfect homogeneity of the mixture of the constituents, which is indispensable for ensuring the high quality of the polyurethane foam supplied in pipe 12.

The gas injected from container 10 by pipe 11 into the polyol channel 24 brings about a very fine emulsification of the mixture. The thus treated isocyanate and polyol are then dosed and intimately mixed in chamber 25. The dosing of the products is ensured by regulating the injection nozzles 23a, 24a, which takes account of the operating pressure and viscosity of the products in the temperature range in question. The intimate mixing of the products is ensured, according to the invention, by the off-centered arrangement of nozzles 23a, 24a, which produce a whirling outflow in mixing chamber 25.

The apparatus according to the invention operates in a rapid, automatic, autonomous manner at any point of use and is entirely automatic as from the initial electrical instruction of circuit 5, which brings about the necessary firing with the aid of the starter or trip 4. The absence of any complex or mobile mechanical device downstream thereof ensures that the system has a very high reliability level and the storage of products in sealed tight tanks offers the best guarantee of a long life thereof. Finally, it should be noted that the power of the gas generator 4 associated with the large capacity of the mixing chamber 25, permits a very fast production of top quality polyurethane foam.

What is claimed is:

1. An automatic, autonomous apparatus for the fast production of polyurethane foam comprising means defining a tight storage tank; means dividing said tank into distinctly separate compartments for respectively containing an isocyanate and a polyalcohol; solid propellant gas generation means located in an upper portion of said storage tank; outlet means located at a lower portion of said tank for each of said compartments; pressure threshold mixer means connected to said lower portion of said tank and having manometric trigger means slidably movable in a linear channel in said mixer means, calibrated shearable pin means and a mixing chamber with laterally disposed inlets; said manometric trigger means having a pressure threshold and being actuatable at a predetermined pressure to communicate said compartments via said outlet means with said mixing chamber; said laterally disposed inlets arranged to produce rotational flow in said mixing chamber; means defining and containing a source of neutral gas connected to and communicating with said mixer means to feed gas to one of said laterally disposed inlets upon actuation of said trigger means; rupture means associated with said gas generating means and said dividing means which when ruptured allows gas generated by said gas generating means to exert pressure on said isocyanate and said polyalcohol in said compartments which in turn exert pressure on said manometric trigger means; said manometric trigger means being maintained in a storage position by said calibrated shearable pins and an operating position when said calibrated shearable pins are broken by appearance of the pressure threshold from said isocyanate and polyalcohol.

2. An automatic, autonomous apparatus for the fast production of polyurethane foam according to claim 1, wherein said mixing chamber has an outlet means which is connected to a sprinkler, said sprinkler has a plurality of lateral orifices for locally bringing about a turbulent outflow and for increasing the homogeneity of the emulsified mixture.

* * * * *